United States Patent [19]
Bennett

[11] Patent Number: 5,590,683
[45] Date of Patent: Jan. 7, 1997

[54] COMPENSATING RELIEF VALVE

[76] Inventor: Barry D. Bennett, 332 Courtland Ave., Harleysville, Pa. 19438

[21] Appl. No.: 320,666

[22] Filed: Oct. 11, 1994

[51] Int. Cl.$^6$ ................................................ F16K 17/04
[52] U.S. Cl. ........................ 137/454.5; 137/508; 137/509; 137/625.38
[58] Field of Search .................................. 137/508, 509, 137/454.5, 625.38

[56] References Cited

U.S. PATENT DOCUMENTS

| | | | |
|---|---|---|---|
| 3,054,420 | 9/1962 | Williams | 137/508 X |
| 5,007,454 | 4/1991 | Lee | 137/508 |
| 5,255,704 | 10/1993 | Bennett | 137/454.5 |
| 5,375,623 | 12/1994 | Weber | 137/454.5 |

FOREIGN PATENT DOCUMENTS 681277 8/1979 U.S.S.R. ................................ 137/508

*Primary Examiner*—Stephen M. Hepperle
*Attorney, Agent, or Firm*—Robert Charles Beam

[57] ABSTRACT

The present invention shows a cartridge-type, compensating relief valve for use in a manifold cavity is disclosed. The valve comprises a gland removably secured within the manifold cavity, and having a circular valve seat and a central cavity therethrough. The valve also comprises a valve stem extending through the central cavity and moveable between an open and a closed position. The valve stem has a piston portion extending into the manifold cavity and piston ports extending from the outward face to the inward face of the piston. The piston ports diverge radially from a central point on the outward face of the piston to points around the circumference of the inward face. The valve is also provided with at least one internal fluid chamber in direct pressure communication with the entry port of the cavity, which permits fluid pressure to be directed against at least one internal surface of said valve stem, exerting a force tending to hold the valve in an open position. Means to adjust the sensitivity of the valve, both locally and from a central location, are also shown.

20 Claims, 3 Drawing Sheets

COMPENSATING RELIEF VALVE

BACKGROUND OF THE INVENTION

1. Field of the Invention

The present invention relates to a cartridge-type, compensating relief valve for use in a manifold cavity. In particular, the present invention relates to a cartridge-type, compensating relief valve for use in a manifold cavity having entry and exit fluid ports defining a fluid path, said valve comprising:

1) a gland removably secured with at least a portion thereof within at least a portion of said manifold cavity, said gland having a circular valve seat in operative communication with said fluid path of said manifold cavity, said gland having a central cavity therethrough;

2) a valve stem extending through the central cavity of said gland and being moveable therein between an open valve position permitting fluid flow within said fluid path and a closed valve position prohibiting fluid flow within said fluid path, said valve stem further comprising:
   a) a piston portion located at a first end of said valve stem extending into said manifold cavity and positioned within the fluid path of said manifold cavity, said piston portion having:
      i) an outward face in direct fluid communication with said entry fluid port of said manifold cavity, such that fluid pressure on the surface area of said outward face of said piston tends to hold said valve in a closed position, and
      ii) an inward face in operative contact with the valve seat of said gland when said valve is in the closed position and in direct fluid communication with said exit port of said manifold cavity when said valve is in an open position; and,
   b) a plurality of piston ports open in both the outward face and the inward face of said piston, said piston ports being radially divergent from a central point on the outward face of said piston to points around the circumference of the inward face of the piston in the area of said valve seat;

3) at least one internal fluid chamber in direct pressure communication with said entry port of said manifold cavity, and permitting fluid pressure approximately equal to the fluid pressure directed against the outward face of said piston to be directed against at least one internal surface of said valve stem, exerting a force tending to hold the valve in an open position; and, 4) means to adjust the sensitivity of said valve.

According to another embodiment of the present invention, there is provided a cartridge-type, compensating relief valve for use in a manifold cavity having entry and exit fluid ports defining a fluid path, said valve comprising:

1) a gland removably secured with at least a portion thereof within at least a portion of said manifold cavity, said gland having a circular valve seat in operative communication with said fluid path of said manifold cavity, said gland having a central cavity therethrough;

2) a valve stem extending through the central cavity of said gland and being moveable therein between an open valve position permitting fluid flow within said fluid path and a closed valve position prohibiting fluid flow within said fluid path, said valve stem further comprising:
   a) a piston portion located at a first end of said valve stem extending into said manifold cavity and positioned within the fluid path of said manifold cavity, said piston portion having:
      i) an outward face in direct fluid communication with said entry fluid port of said manifold cavity, such that fluid pressure on the surface area of said outward face of said piston tends to hold said valve in a closed position, and
      ii) an inward face in operative contact with the valve seat of said gland when said valve is in the closed position and in direct fluid communication with said exit port of said manifold cavity when said valve is in an open position;
   b) a plurality of piston ports open in both the outward face and the inward face of said piston, said piston ports being radially divergent from a central point on the outward face of said piston to points around the circumference of the inward face of the piston in the area of said valve seat; and,
   c) a central fluid communication port in the outward face of said piston and extending centrally along at least a portion of the length of said valve stem;

3) a first internal fluid chamber in direct pressure communication with said entry port of said manifold cavity by way of said piston ports, and permitting fluid pressure to be directed against the inward face of said piston, exerting a force upon said inward face tending to hold the valve in an open position;

4) a second internal fluid chamber in direct pressure communication with said entry port of said manifold cavity by way of said central fluid communication port, and permitting fluid pressure to be directed against at least one internal surface of said valve stem, exerting a force upon said internal surface tending to hold the valve in an open position; and, 5) means to adjust the sensitivity of said valve.

2. Description of Related Art

Cartridge within-a-cavity valves are widely used for controlling the flow of many fluids, including applications where the flow control of high pressure hydraulic fluid is desired. Cartridge-type valves are widely used because the internal components of the valve may be easily removed and replaced from a manifold cavity for maintenance and repair.

Cartridge valves are commonly used in a manifold cavity of the type shown in FIG. 1. Referring to this figure, fluid enters the cavity through port 6 and exhausts through port 5. A cylinder 4 receives the valve at the base of the manifold. Our earlier U.S. Pat. No. 5,255,704, shows an hydraulic valve intended for use in this environment, and the teachings of that reference are herein incorporated by reference as if fully set out herein.

That invention was successful in overcoming problems encountered in valves, but only for hydraulic valves, which could be opened or closed at an operators discretion, but which did not provide for automatic operation, as a check valve or relief valve might. Check valve are employed to be sure that fluid flow within a cavity can only be in one direction. A good example of such a valve appears in our earlier U.S. Pat. No. 4,936,339, entitled CARTRIDGE-TYPE CHECK VALVE. A relief valve, on the other hand, is intended to remain closed unless the pressure within a system exceeds a certain pre-selected limit, at which time the valve will automatically open, relieving the excess pressure.

One of the major difficulties with such relief valves, is that they require some kind of internal biasing, usually a strong spring, to provide the force necessary to keep the valve in a closed position. As the pressures for which the valves are employed increase, however, the spring tension coefficient k must increase as well, resulting in a need for a variety of valves for different pressure uses and a loss in sensitivity of the valve mechanism as the pressure requirements increase.

SUMMARY OF THE INVENTION

It is an object of the present invention to provide a cartridge-type relief valve which can be employed across a broad range of pressure environments.

A further object of the present invention is to provide a cartridge-type relief valve which will have greater sensitivity at higher pressures.

The other objects, features and advantages of the present invention will become more apparent in light of the following detailed description of the preferred embodiment thereof.

According to the preferred embodiment of the present invention, there is provided a cartridge-type, compensating relief valve for use in a manifold cavity having entry and exit fluid ports defining a fluid path, said valve comprising:

1) a gland removably secured with at least a portion thereof within at least a portion of said manifold cavity, said gland having a circular valve seat in operative communication with said fluid path of said manifold cavity, said gland having a central cavity therethrough;

2) a valve stem extending through the central cavity of said gland and being moveable therein between an open valve position permitting fluid flow within said fluid path and a closed valve position prohibiting fluid flow within said fluid path, said valve stem further comprising:
   a) a piston portion located at a first end of said valve stem extending into said manifold cavity and positioned within the fluid path of said manifold cavity, said piston portion having:
      i) an outward face in direct fluid communication with said entry fluid port of said manifold cavity, such that fluid pressure on the surface area of said outward face of said piston tends to hold said valve in a closed position, and
      ii) an inward face in operative contact with the valve seat of said gland when said valve is in the closed position and in direct fluid communication with said exit port of said manifold cavity when said valve is in an open position; and,
   b) a plurality of piston ports open in both the outward face and the inward face of said piston, said piston ports being radially divergent from a central point on the outward face of said piston to points around the circumference of the inward face of the piston in the area of said valve seat;

3) at least one internal fluid chamber in direct pressure communication with said entry port of said manifold cavity, and permitting fluid pressure approximately equal to the fluid pressure directed against the outward face of said piston to be directed against at least one internal surface of said valve stem, exerting a force tending to hold the valve in an open position; and, 4) means to adjust the sensitivity of said valve.

According to another embodiment of the present invention, there is provided a cartridge-type, compensating relief valve for use in a manifold cavity having entry and exit fluid ports defining a fluid path, said valve comprising:

1) a gland removably secured with at least a portion thereof within at least a portion of said manifold cavity, said gland having a circular valve seat in operative communication with said fluid path of said manifold cavity, said gland having a central cavity therethrough;

2) a valve stem extending through the central cavity of said gland and being moveable therein between an open valve position permitting fluid flow within said fluid path and a closed valve position prohibiting fluid flow within said fluid path, said valve stem further comprising:
   a) a piston portion located at a first end of said valve stem extending into said manifold cavity and positioned within the fluid path of said manifold cavity, said piston portion having:
      i) an outward face in direct fluid communication with said entry fluid port of said manifold cavity, such that fluid pressure on the surface area of said outward face of said piston tends to hold said valve in a closed position, and
      ii) an inward face in operative contact with the valve seat of said gland when said valve is in the closed position and in direct fluid communication with said exit port of said manifold cavity when said valve is in an open position;
   b) a plurality of piston ports open in both the outward face and the inward face of said piston, said piston ports being radially divergent from a central point on the outward face of said piston to points around the circumference of the inward face of the piston in the area of said valve seat; and,
   c) a central fluid communication port in the outward face of said piston and extending centrally along at least a portion of the length of said valve stem;

3) a first internal fluid chamber in direct pressure communication with said entry port of said manifold cavity by way of said piston ports, and permitting fluid pressure to be directed against the inward face of said piston, exerting a force upon said inward face tending to hold the valve in an open position;

4) a second internal fluid chamber in direct pressure communication with said entry port of said manifold cavity by way of said central fluid communication port, and permitting fluid pressure to be directed against at least one internal surface of said valve stem, exerting a force upon said internal surface tending to hold the valve in an open position; and, 5) means to adjust the sensitivity of said valve.

DETAILED DESCRIPTION OF THE PREFERRED EMBODIMENT

Figure 7:
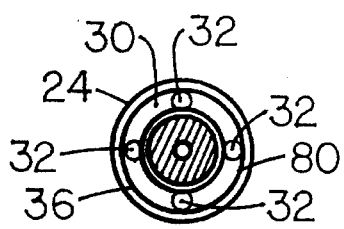
FIG. 7 is a top sectional view taken from FIG. 6, as shown in that figure.
Figure 8:
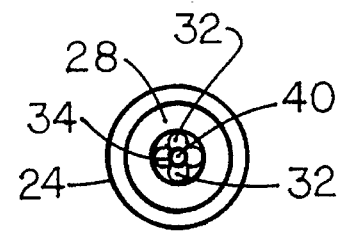
FIG. 8 is a bottom view of the valve stem shown in FIG. 6.

Reference will now be made to the preferred embodiments as shown in the figures of drawings. All figures, except FIGS. 7 and 8, depict longitudinal sectional views. Since the critical valve components are radially symmetrical about a central axis, this view is believed to best depict the various features of the present invention.

Figure 1:
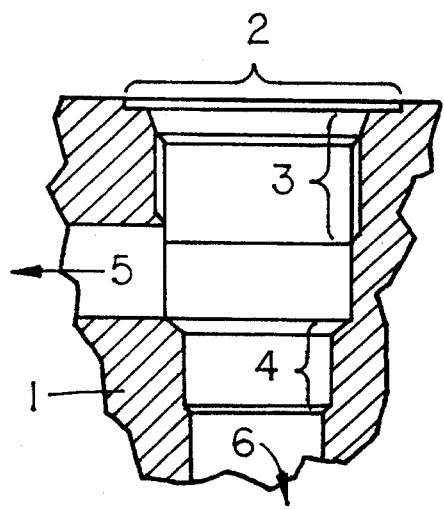
FIG. 1 is a side-sectional view of a typical manifold cavity.

The present invention is a cartridge-type, compensating relief valve for use in a manifold cavity having entry and exit fluid ports defining a fluid path. FIG. 1 is a side-sectional view of a typical manifold cavity. As seen therein, and as noted previously, fluid enters the cavity through entry port 6 and exhausts through exit port 5. A valve cylinder 4 receives the valve at the base of the manifold, and in that position such a valve controls fluid flow through the fluid path from entry port 6 to exit port 5. The cavity is defined by opening 2 in the manifold, with engagement cylinder 3 typically being provided with means to engage a cartridge-type valve, such as screw threads.

Figure 2:
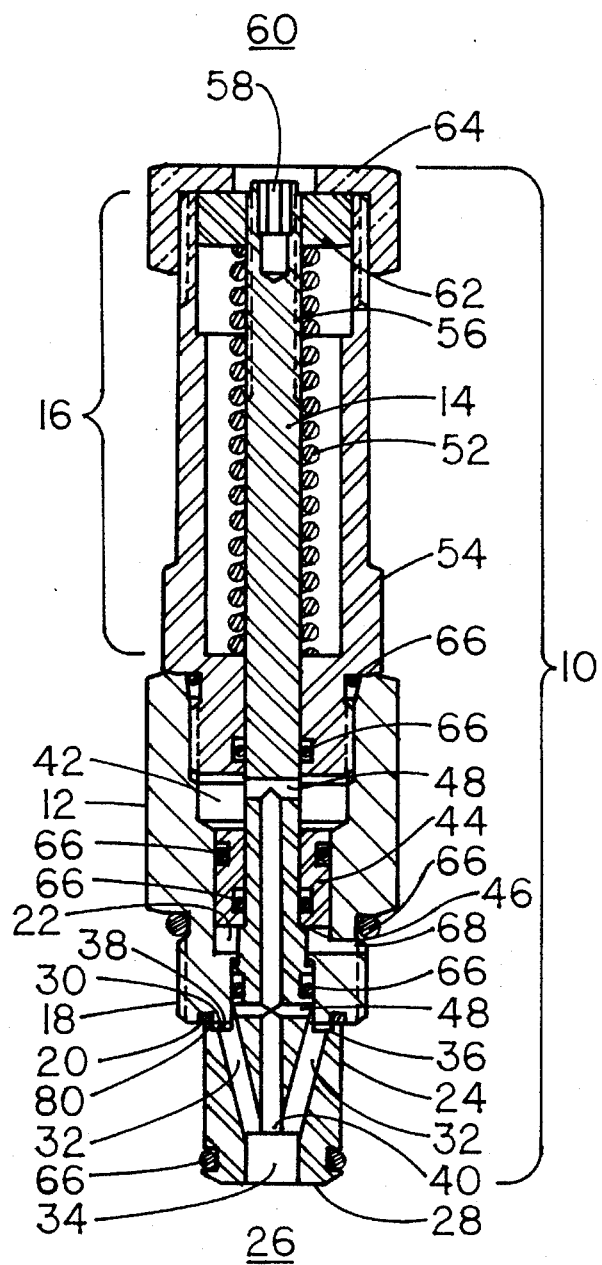
FIG. 2 is a side-sectional view of one embodiment of the valve of the present invention.

FIG. 2 is a side-sectional view of one embodiment of the valve of the present invention. This valve 10 comprises a gland 12, a valve stem 14, and adjustment means 16 to adjust the sensitivity of the valve.

The gland 12 is provided with securing means 18 to removably secure at least a portion of the gland 2 within engagement cylinder 3 of a manifold cavity. The gland 2 is further provided with a circular valve seat 20 positioned in operative communication with said fluid path of the manifold cavity when the valve is installed therein. In addition, the gland 2 is provided with a central cavity 22 therethrough.

Figure 3:
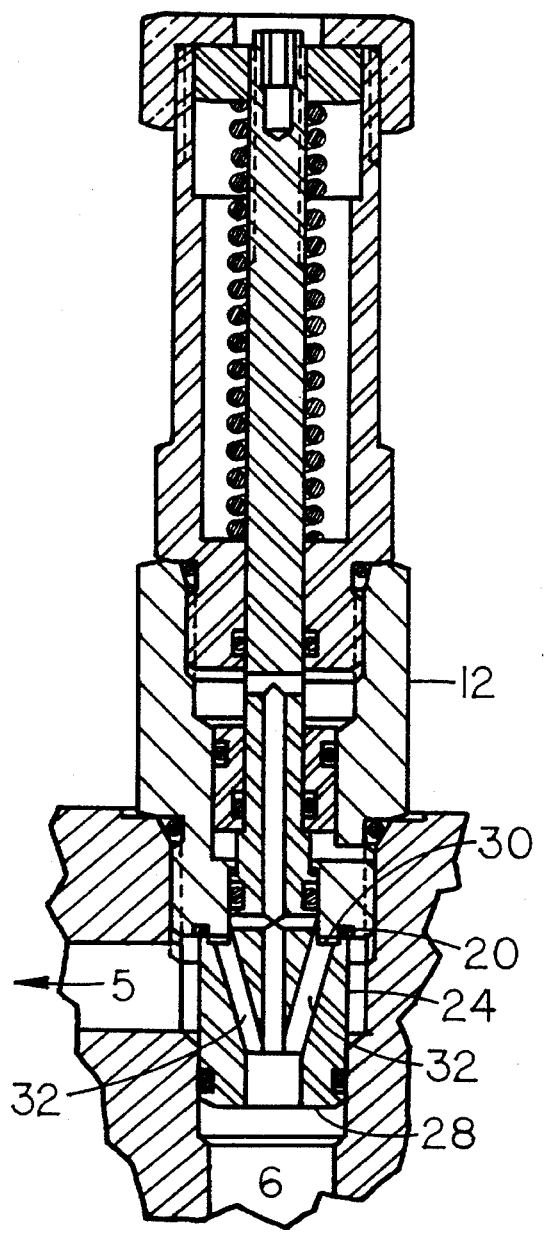
FIG. 3 is a side-sectional view of the embodiment of FIG. 2, with the valve shown in the closed position.
Figure 4:
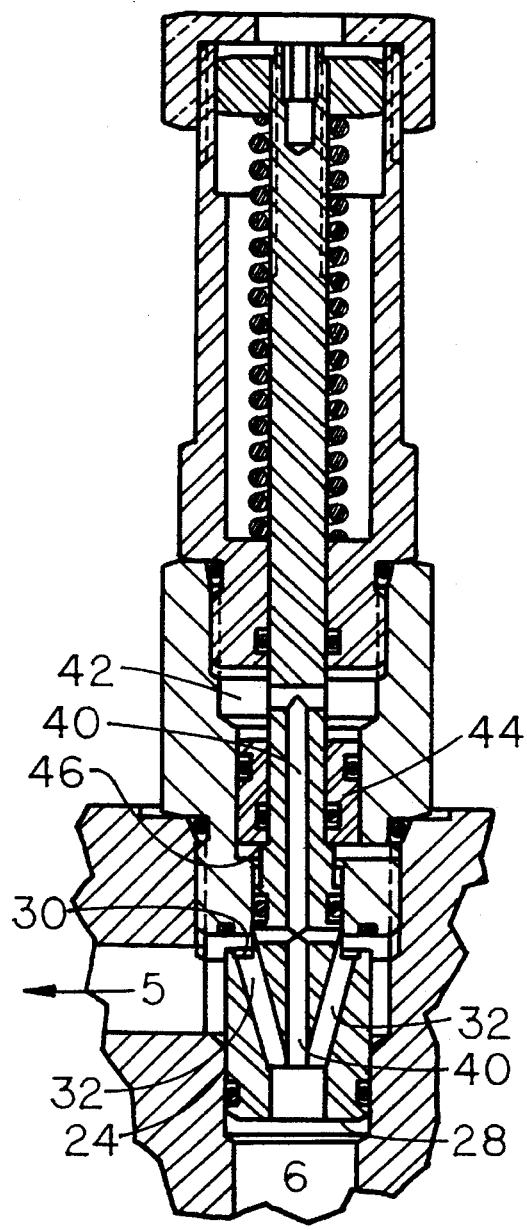
FIG. 4 is a side-sectional view of the embodiment of FIG. 2, with the valve shown in the open position.

With further reference to FIG. 2, the valve 10 of the present invention is further provided with valve stem 14 extending through the central cavity 22 of gland 12 and being moveable therein between an open valve position, illustrated in FIG. 4, permitting fluid flow within the fluid path of the manifold cavity, and a closed valve position, illustrated in FIG. 3, prohibiting fluid flow within the fluid path.

As shown in FIG. 2, the valve stem 14 of the preferred embodiment further comprises a piston portion 24, located at a first end 26 of the valve stem 14. When the valve 10 of the present invention is inserted into a manifold cavity of the type shown in FIG. 1, the piston portion 24 will extend into the valve cylinder 4 of the manifold cavity and be positioned within the fluid path of the manifold cavity. In this installed position, the piston portion 24 will have an outward face 28 in direct fluid communication with the fluid entry port 6 of a manifold cavity, such that fluid pressure on the surface area of the outward face 28 of the piston 24 will tend to hold the valve 10 in a closed position, illustrated in FIG. 3.

As further illustrated in FIG. 2, the piston 24 is further provided with an inward face 30 in operative contact with the circular valve seat 20 of the gland 12 when the valve 10 is in the closed position illustrated in FIG. 3. Further, the inward face 30 of the piston 24 is in direct fluid communication with the fluid exit port 5 of the manifold cavity when the valve 10 is in an open position, as illustrated in FIG. 4.

The piston portion 24 of the valve stem 14 of the valve 10 of the present invention is further provided with a plurality of piston ports 32 communicating between the outward face 28 and the inward face 30 of said piston 24. These piston ports 32 are radially divergent from a central point 34 on the outward face 28 of the piston 24 to points around the circumference 36 of the inward face 30 of the piston 24 in the area of the circular valve seat 20 of the gland 12. This construction is similar in all respects to our earlier U.S. Pat. No. 5,255,704, incorporated by reference, and particularly FIGS. 7, 8, and 9 of that reference.

Unrecognized in that reference to a hydraulic stop valve, however, these piston ports 32 allowed the communication of fluid pressure from fluid entry port 6 to exert a force on the inward face 30 of piston 24. While this circumstance had little or no meaning in a manually controlled hydraulic stop valve, in the present invention this construction creates a first internal fluid chamber 38 in direct pressure communication with the fluid entry port 6 of a manifold cavity, permitting fluid to be directed against at least one internal surface of the valve stem 14, in this case the inward face 30 of piston 24, and exerting a force tending to hold the valve in an open position. In previous designs, such as that shown in our earlier U.S. Patent, however, the surface area against which this force is directed was minimal, and insufficient to balance the direct fluid pressure directed against the outward face 28 of the piston 24 from the fluid entry port 6.

It would be possible to balance the surface area of the outward face 28 of the piston 24 with the surface area of the inward face 30 of the piston 24, thereby compensating for the force exerted on the piston 24 from fluid entry port 6, and such a construction is contemplated hereunder. However, in the preferred embodiment illustrated, the fluid chamber created in this manner serves as a first internal fluid chamber 38 in direct pressure communication with the fluid entry port 6 of a manifold cavity by way of the piston ports 32, and permitting fluid pressure to be directed against the inward face 30 of the piston 24, exerting a force upon the inward face 30 tending to hold the valve 10 in an open position, as illustrated in FIG. 4.

In addition, the preferred embodiment of the present invention is further provided with a central fluid communication port 40 in the outward face 28 of the piston 24 and extending centrally along at least a portion of the length of the valve stem 14. This central fluid communication port 40 permits direct fluid communication from the fluid entry port 6 to a second internal fluid chamber 42, and permits fluid pressure to be directed against at least one internal surface of the valve stem 4, exerting a force upon that internal surface tending to hold the valve in an open position. In the illustrated embodiment, this force acts indirectly, against sliding collar 44, which in turn acts upon valve stem 14 at annular shoulder 46, allowing a greater surface area than annular shoulder 46 itself provides.

To assist in the equalization of fluid pressures internally, the valve stem 14 may be further provided with fluid pressure equalization channels 48, permitting fluid communication and insuring equalization of pressures between the central fluid communication port 40 and the first internal fluid chamber 38.

In this manner, it is possible to attempt to balance the surface area of the outward face 28 of piston 24 with the surface area of a first internal fluid chamber 38 and second internal fluid chamber 42, making operation of the relief valve 10 almost neutral at any system pressure. It is envisioned that a valve of this design would be operable at any pressure, for example, from five pounds per square inch (5 psi) operating pressure to seven thousand pounds per square inch (7000 psi) with no effect on the valve operation. It appears, more over, that there are no functional limits on the valve operation as the parts are not stressed, and unless subjected to pressures sufficient to deform the materials from which the components are constructed, the valve should remain operable.

Further, the valve 10 includes adjustment means 16 to adjust the sensitivity of valve action. As noted previously, relief valve of the prior art commonly employed spring biased pistons. When the force on the face of the piston exceeded the strength of the spring, the valve would open and release fluid pressure. In such constructions, it was common to employ some mechanism to adjust the spring, but generally, as the system pressure increased, the strength of the spring had to be increased as well. The ability to finely adjust the spring decreased with the strength of the spring. In the present invention, a spring 52 housed within adjustment collar 54 is employed to adjust the sensitivity of the valve 10. In the illustrated embodiment, adjustment collar 54 is hexagonal in cross-section. Turning valve stem 14, which is provided with threads 56 along at least a portion thereof, by key way 58 in the second end 60 of said valve stem 14, has the effect of moving adjustment nut 62 up or down within adjustment collar 54, changing the compression of spring 52.

Cap 64 may be provided to at least partially enclose adjustment means 16, but will preferably allow continued adjustment of the adjustment means 16, as by providing continued external access to key way 58.

In this manner, the device of the present invention permits a spring 52 with a small spring coefficient k to be employed in a relief valve for use in a high pressure environment, and for that relief valve to have a sensitivity which was not heretofore possible in an environment with pressure of such magnitude. Further, the relief valve of the present design can be employed across a broad range of pressures, bringing the same high level of sensitivity to each application.

FIG. 3 is a side-sectional view of the embodiment of FIG. 2, with the valve shown in the closed position. In this position, piston 24 resides with its inward face 30 in contact with the circular valve seat 20 of gland 12.

FIG. 4 is a side-sectional view of the embodiment of FIG. 2, with the valve shown in the open position. In this position, piston 24 resides with its inward face 30 in fluid communication with fluid exit port 5 of the manifold cavity.

Figure 5:
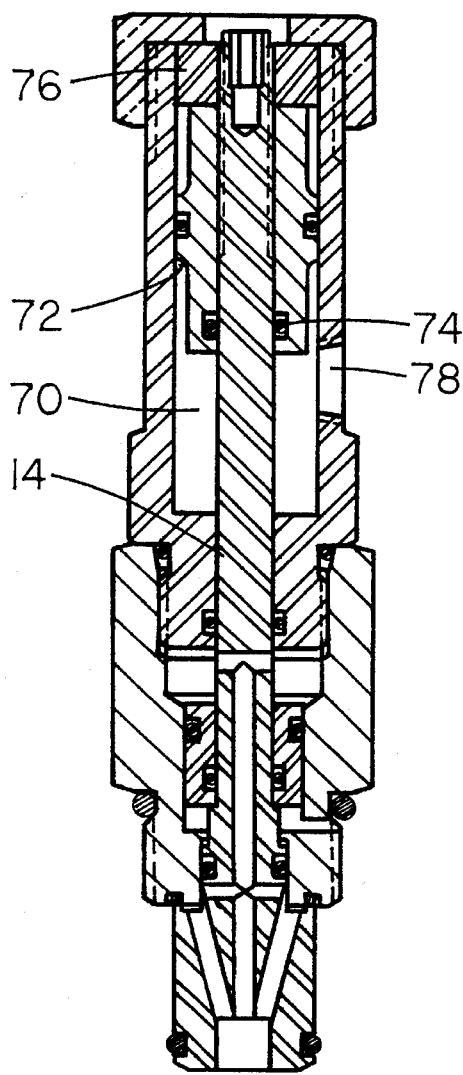
FIG. 5 is a side-sectional view of another embodiment of the present invention.

FIG. 5 is a side-sectional view of another embodiment of the present invention. This embodiment is the same in all operative characteristics of valve 10 of FIG. 2, except that adjustment means 16 operates differently. In this embodiment, rather than the use of a mechanical spring 52 as in the device of FIG. 2, a gas column 70, defined by the valve stem 14, the adjustment collar 72, and annular gas column retention ring 74. This gas column 70 provides a sensitive biasing mechanism, just as a spring would, and can be adjusted individually and locally by adjustment nut 76. The use of such a gas column 70 also permits adjustment from a remote location by means of compressed gas connection 78, which will permit a remote operator to increase or decrease of gas pressure in the gas column 70 of one or more such valves simultaneously.

Figure 6:
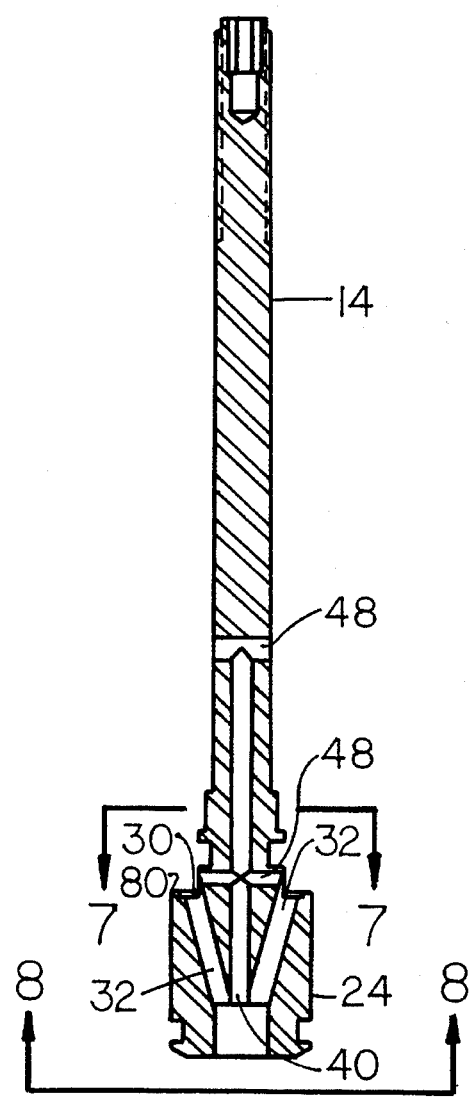
FIG. 6 is a side-sectional view of a portion of the valve stem of the present invention.

FIG. 6 is a side-sectional view of a portion of the valve stem 14 of the present invention, shown in isolation. This view shows the piston ports 32 as well as central fluid communication port 40 and fluid pressure equalization channels 48. This view can be contrasted with FIG. 7 of U.S. Pat. No. 5,255,704 for the construction of a device with only a single internal fluid chamber defined by the inward face 30 of piston 24.

FIG. 7 is a top sectional view taken from FIG. 6, as shown in that figure, showing the piston ports 32 in communication with the inward face 30 of piston 24 at its circumference 36. This view also shows annular rim 80 which is believed to improve valve seating. Rim 80 is raised from the surface of inward face 30 of piston 24, which becomes embedded in circular valve seat 20 of gland 12 when the valve 10 is closed. This view can be contrasted with FIG. 8 of U.S. Pat. No. 5,255,704 for the construction of a device with only a single internal fluid chamber defined by the inward face 30 of piston 24.

FIG. 8 is a bottom view of the valve stem 4 shown in FIG. 6, showing the piston ports 32 and the central fluid communication port 40 in communication with the outward face 28 of piston 24 at central point 34.

The valve 10 of the present invention can be constructed of various suitable materials. In the preferred embodiment, however, the gland 12, valve stem 14, sliding collar 44, and cap 64 should be fabricated from 316 Stainless Steel, schedule QQ-S-763, while the adjustment collar 54 and adjustment nut 62 should preferably be fabricated from 304 Stainless Steel, schedule QQ-S-763. Alternatively, all of these parts could be fabricated from either of these grades of stainless or from titanium.

The gland 12 and cap 64 could also suitably be fabricated from brass, as well, while the valve stem 14, sliding collar 44, adjustment collar 54, adjustment nut 62, and cap 64 could also suitably be fabricated of Monel. Additionally, the cap 64 could also be fabricated from plastic.

If a spring 52 is employed, it should preferably be fabricated from 302 Stainless Steel, meeting ASTM A313, although Inconel and Chrome Vanadium, meeting ASTM A232, could also be employed.

One skilled in the art will recognize that a valve of this nature must be sealed at various points to prevent the inadvertent loss of pressurized fluid, and such seals 66, in the nature of elastomeric O-rings, are shown in the drawing Figures. For the most part, these elastomeric O-rings can preferably be fabricated from an elastomeric material commercially available as "Buna-n", although Viton® (fluorocarbon), Chemrez® Type 510 and Kalrez® Type 3018 are also suitable for this use.

The elastomeric material shown at circular valve seat 20, however, must function in an environment involving the opening and closing of the valve. For this reason, a commercial grade of nylon is preferred for this position in the preferred embodiment. Suitable alternatives include materials commercially available under the trade designations Celezole and Vespel.

As shown in our earlier U.S. Pat. 5,255,704, the valve 10 of the present invention may further include a raised rim 80, shown in FIG. 6, projecting inward from the circumference 36 of the inward face 30 of the piston 24. In operation, this rim 50 is embedded into the elastomeric material of the seal at circular valve seat 20 when the valve 10 is in its closed position.

One skilled in the art will also recognize that valve of this nature are often provided with a low-pressure cavity and relief hole, shown as 68 in the accompanying figures, and such a feature can be provided in the valve 10 of the present invention.

Other features, advantages, and specific embodiments of this invention will become readily apparent to those exercising ordinary skill in the art after reading the foregoing disclosures. These specific embodiments are within the scope of the claimed subject matter unless otherwise expressly indicated to the contrary. More over, while specific embodiments of this invention have been described in considerable detail, variations and modifications of these embodiments can be effected without departing from the spirit and scope of this invention as disclosed and claimed.

What is claimed is:

1. A cartridge-type, compensating relief valve for use in a manifold cavity having entry and exit fluid ports defining a fluid path, said valve comprising:

1) a gland removably secured with at least a portion thereof within at least a portion of said manifold cavity, said gland having a circular valve seat in operative communication with said fluid path of said manifold cavity, said gland having a central cavity therethrough;

2) a valve stem extending through the central cavity of said gland and being moveable therein between an open valve position permitting fluid flow within said fluid path and a closed valve position prohibiting fluid flow within said fluid path, said valve stem further comprising:

a) a piston portion located at a first end of said valve stem extending into said manifold cavity and positioned within the fluid path of said manifold cavity, said piston portion having:

i) an outward face in direct fluid communication with said entry fluid port of said manifold cavity, such that fluid pressure on the surface area of said outward face of said piston tends to hold said valve in a closed position, and ii) an inward face in operative contact with the valve seat of said gland when said valve is in the closed position and in direct fluid communication with said exit port of said manifold cavity when said valve is in an open position; and, b) a plurality of piston ports open in both the outward face and the inward face of said piston, said piston ports being radially divergent from a central point on the outward face of said piston to points around the circumference of the inward face of the piston in the area of said valve seat;

3) at least one internal fluid chamber in direct pressure communication with said entry port of said manifold cavity, and permitting fluid pressure approximately equal to the fluid pressure directed against the outward face of said piston to be directed against at least one internal surface of said valve stem, exerting a force tending to hold the valve in an open position; and, 4) means to adjust the sensitivity of said valve.

2. A cartridge-type, compensating relief valve for use in a manifold cavity having entry and exit fluid ports defining a fluid path, said valve comprising:

1) a gland removably secured with at least a portion thereof within at least a portion of said manifold cavity, said gland having a circular valve seat in operative communication with said fluid path of said manifold cavity, said gland having a central cavity therethrough;

2) a valve stem extending through the central cavity of said gland and being moveable therein between an open valve position permitting fluid flow within said fluid path and a closed valve position prohibiting fluid flow within said fluid path, said valve stem further comprising:

a) a piston portion located at a first end of said valve stem extending into said manifold cavity and positioned within the fluid path of said manifold cavity, said piston portion having:

i) an outward face in direct fluid communication with said entry fluid port of said manifold cavity, such that fluid pressure on the surface area of said outward face of said piston tends to hold said valve in a closed position, and ii) an inward face in operative contact with the valve seat of said gland when said valve is in the closed position and in direct fluid communication with said exit port of said manifold cavity when said valve is in an open position;

b) a plurality of piston ports open in both the outward face and the inward face of said piston, said piston ports being radially divergent from a central point on the outward face of said piston to points around the circumference of the inward face of the piston in the area of said valve seat; and, c) a central fluid communication port in the outward face of said piston and extending centrally along at least a portion of the length of said valve stem;

3) a first internal fluid chamber in direct pressure communication with said entry port of said manifold cavity by way of said piston ports, and permitting fluid pressure to be directed against the inward face of said piston, exerting a force upon said inward face tending to hold the valve in an open position;

4) a second internal fluid chamber in direct pressure communication with said entry port of said manifold cavity by way of said central fluid communication port, and permitting fluid pressure to be directed against at least one internal surface of said valve stem, exerting a force upon said internal surface tending to hold the valve in an open position; and, 5) means to adjust the sensitivity of said valve.

3. The valve of claim 1 wherein said gland is provided with threads to enable said gland to be threadably engaged into a manifold cavity.

4. The valve of claim 2 wherein said gland is provided with threads to enable said gland to be threadably engaged into a manifold cavity.

5. The valve of claim 1 wherein said circular valve seat is provided with sealing means adapted to operate in an environment in which the valve is repeatedly opened and closed.

6. The valve of claim 2 wherein said circular valve seat is provided with sealing means adapted to operate in an environment in which the valve is repeatedly opened and closed.

7. The valve of claim 5 wherein said sealing means is selected from the group consisting of Nylon®, Celezole and Vespel.

8. The valve of claim 6 wherein said sealing means is selected from the group consisting of Nylon®, Celezole and Vespel.

9. The valve of claim 5 wherein said piston portion is further provided with a raised, inward facing rim extending from the circumference of the inward face of said piston portion, adapted to engage the sealing means of said circular valve seat to effect closure of said valve.

10. The valve of claim 6 wherein said piston portion is further provided with a raised, inward facing rim extending from the circumference of the inward face of said piston portion, adapted to engage the sealing means of said circular valve seat to effect closure of said valve.

11. The valve of claim wherein means to adjust the sensitivity of said valve is comprised, at least in part, of a spring.

12. The valve of claim 2 wherein means to adjust the sensitivity of said valve is comprised, at least in part, of a spring.

13. The valve of claim wherein the spring is tensioned to provide a bias tending to hold the valve in its closed position.

14. The valve of claim 2 wherein the spring is tensioned to provide a bias tending to hold the valve in its closed position.

15. The valve of claim wherein means to adjust the sensitivity of said valve is comprised, at least in part, of a chamber containing a pneumatic fluid.

16. The valve of claim 2 wherein means to adjust the sensitivity of said valve is comprised, at least in part, of a chamber containing a pneumatic fluid.

17. The valve of claim 5 wherein the pressure within said pneumatic fluid chamber can be controlled from a remote location.

18. The valve of claim 6 wherein the pressure within said pneumatic fluid chamber can be controlled from a remote location.

19. The valve of claim further comprising a protective cap at least partially enclosing said adjustment means.

20. The valve of claim 2 further comprising a protective cap at least partially enclosing said adjustment means.

* * * * *